United States Patent [19]

Howlett

[11] 4,361,524

[45] Nov. 30, 1982

[54] COOLING TOWER WITH PLUME PREVENTION SYSTEM

[76] Inventor: Larry D. Howlett, 913 Suburban Apartments, DeKalb, Ill. 60115

[21] Appl. No.: 845,122

[22] Filed: Oct. 25, 1977

[51] Int. Cl.³ .............................................. B01F 3/04
[52] U.S. Cl. ........................... 261/150; 261/DIG. 77; 261/DIG. 11; 261/159
[58] Field of Search ............... 261/DIG. 77, DIG. 11, 261/159, 161, 150

[56] References Cited

U.S. PATENT DOCUMENTS

| | | | |
|---|---|---|---|
| 2,525,045 | 10/1950 | Richardson | 261/161 |
| 2,990,031 | 6/1961 | Michael | 261/DIG. 11 |
| 3,666,246 | 5/1972 | Cohen | 261/DIG. 11 |
| 3,685,579 | 8/1972 | Spangemacher | 261/161 |
| 3,865,911 | 2/1975 | Lefevre | 261/DIG. 77 |
| 3,878,273 | 4/1975 | Anderson | 261/DIG. 11 |
| 3,911,060 | 10/1975 | Bradley, Jr. et al. | 261/150 |
| 3,923,935 | 12/1975 | Cates | 261/DIG. 77 |
| 3,929,435 | 12/1975 | Engalitcheff, Jr. | 261/DIG. 11 |
| 3,982,914 | 9/1976 | Grimble | 261/DIG. 77 |
| 3,994,999 | 11/1976 | Phelps | 261/DIG. 77 |
| 4,003,970 | 1/1977 | Vodicka | 261/DIG. 77 |

Primary Examiner—Tim R. Miles
Attorney, Agent, or Firm—Howard H. Darbo

[57] ABSTRACT

Plume formation by exhaust air from wet cooling towers during periods when ambient air conditions are conducive to the formation of such plumes is prevented by preheating inlet air and/or precooling influent hot water to reduce the temperature difference between the air and water and consequently the water content of exhaust air to that which can be absorbed by the ambient atmosphere thus avoiding plume formation.

2 Claims, 3 Drawing Figures

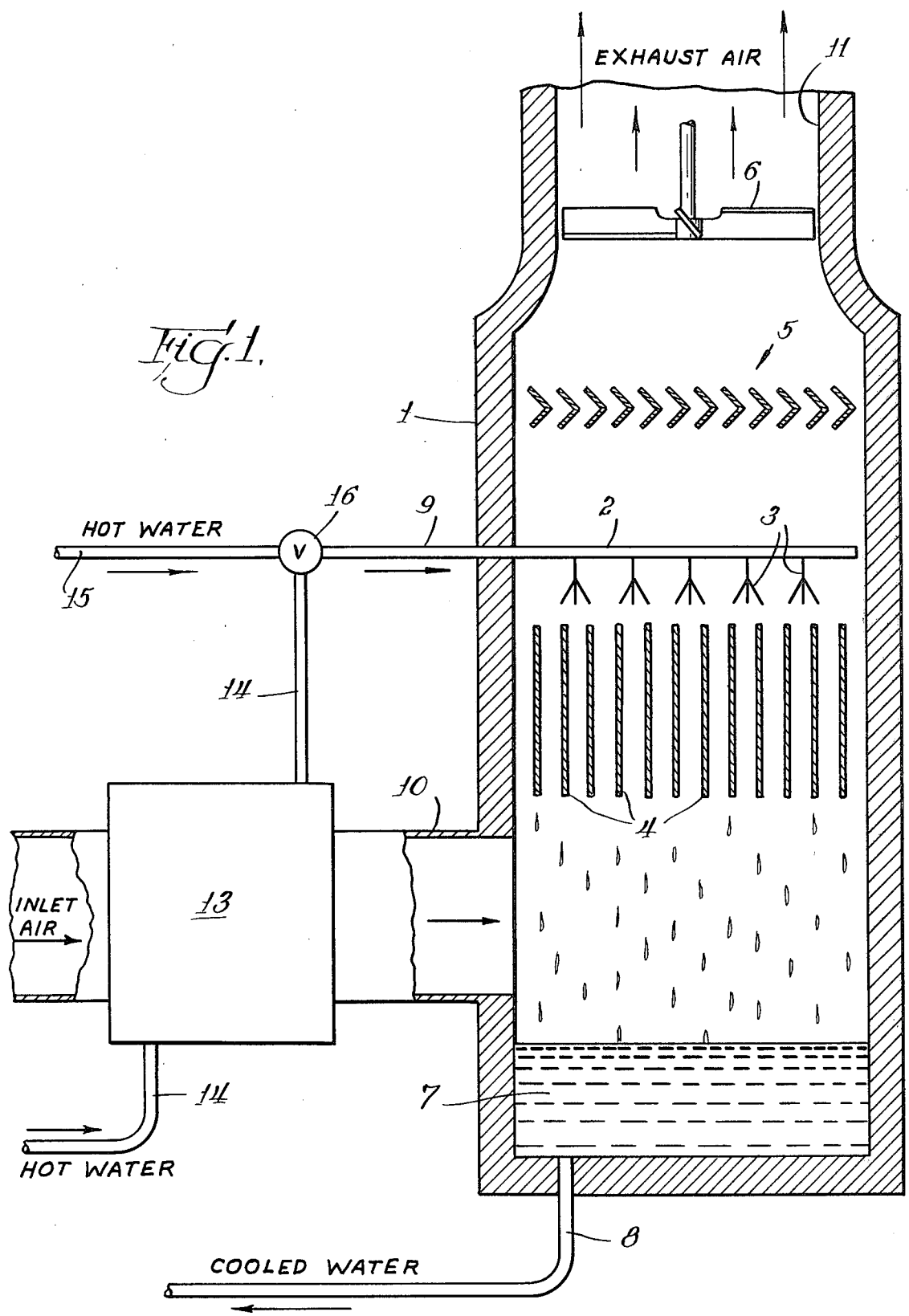

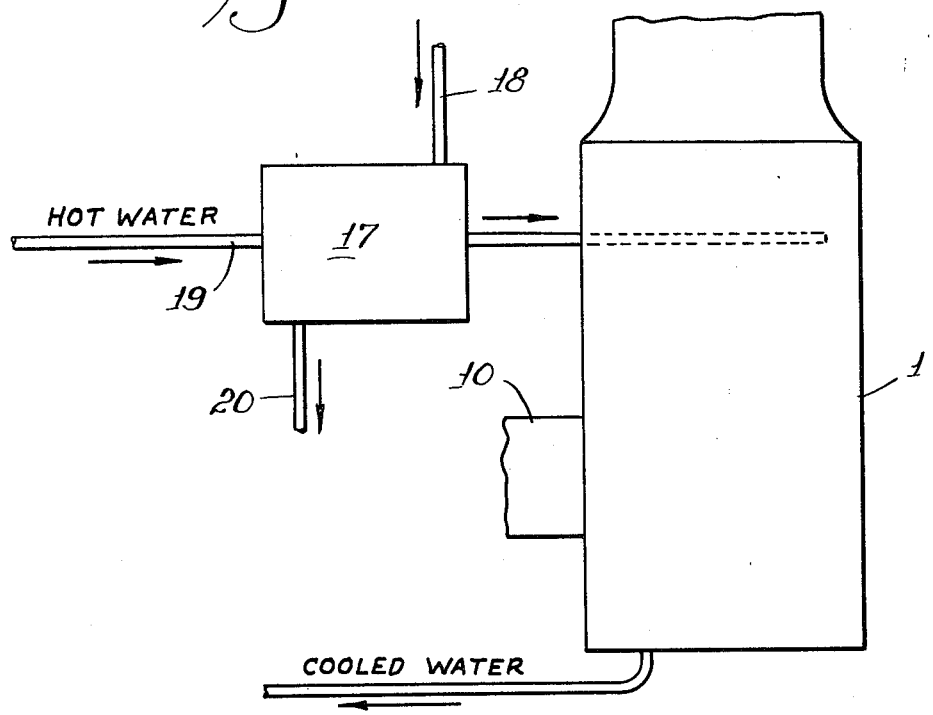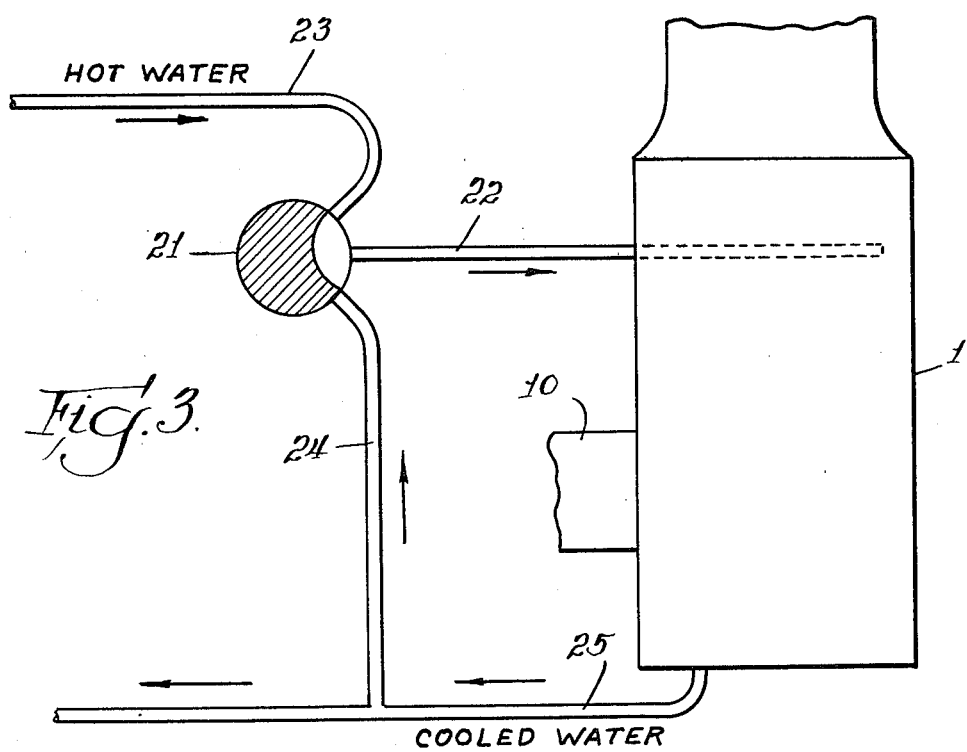

COOLING TOWER WITH PLUME PREVENTION SYSTEM

BACKGROUND OF THE INVENTION

In many industrial processes, in heat-generating procedures, and in the use of steam for power purposes and the like, cooling is required and this is usually provided by heat transfer to cooling air or cooling water. When water is employed for this purpose, closed circuits are used to conserve water and to avoid thermal pollution of streams, lakes, etc. Also, various chemicals may be dissolved in the cooling water to prevent corrosion and for other purposes.

Various expedients have been employed, depending upon the application conditions, to continuously cool the water which has been heated in serving its cooling function. One commonly used type of apparatus for continuously cooling the circulating water is the wet type cooling tower which is essentially an evaporative cooler wherein the hot water is continuously supplied to a fill media which provides a very large wet surface area over which air is passed to evaporate a portion of the water which results in the cooling of the water which passes downwardly through the fill to a sump for reuse. Make-up water in amounts sufficient to replace that evaporated in the cooling tower is usually supplied to the body of cooled water in the sump or other reservoir.

The air blown through the cooling tower is exhausted to the atmosphere, usually upwardly at the top of the tower. In an efficiently designed and operating cooling tower, the exhaust air is at least saturated with water. Cooling tower design criteria necessarily include consideration of ambient air conditions at the location of use of the tower, the temperature and humidity of the air greatly influencing not only the evaporating efficiency but also the absorption of the water by the ambient air from the tower exhaust. A pollution problem results when the ambient air conditions are such that the moisture contained in the tower exhaust air is not only not readily dissipated in the atmosphere but is condensed or otherwise affected to form liquid particles which, together with other similar liquid droplets that may be entrained in the exhaust air, form a visible fog stream or "plume". Again, so long as this plume continues to rise and the droplets are re-evaporated and the moisture thus dissipated into the atmosphere, there is no problem. However, if the plume is not sufficiently buoyant, or loses a degree of buoyancy after passing from the cooling tower, the fog, which may contain troublesome chemicals, may flow to and along the ground, possibly interfering with vision on streets or causing damage or annoyance by wetting the surroundings of the tower. Air movements at the location of the tower may aggravate this problem.

The ambient air conditions which tend to cause plume formation are low temperatures and high relative humidity. The chilling of the exhaust air as it leaves the tower causes condensation of water and loss of buoyancy of the body of exhaust air, both of these changes tending to cause plume formation. High relative humidity of the atmosphere results in slow absorption of the water load of the exhaust air by the atmosphere, contributing to the pluming by failing to evaporate moisture in the liquid state in the exhaust air body.

The object of the invention is to provide a wet cooling tower system which incorporates means for providing operating conditions as required by ambient air conditions to avoid exhaust air plume formation. More specifically, the object of the invention is to provide means for reducing the temperature of the cooling tower influent hot water and/or increasing the temperature of the tower inlet air to limit the magnitude and nature of the water load of the exhaust air as required by ambient air conditions to avoid pluming.

THEORY AND SUMMARY OF PREVIOUS WORK

Plumes may be formed by any evaporative cooling system. Common examples of such systems include forced and natural draft cooling towers, spray cooling ponds, and cooling lakes. Higher structures are less likely to cause ground fog than lower structures. Formation of the plume has been explained as resulting from the condensation of water from the heated saturated air after it exits from the cooling system. The re-evaporation of these fog droplets into the ambient air tends to cool the body of the plume, reducing its buoyancy. This diminished buoyancy, combined with the partial vacuum that is formed downwind of the cooling structure causes the plume to settle to the ground.

A variety of expedients have been employed in attempts to overcome the plume problem. Efforts have been made to increase the lift of the plume in the atmosphere. To this end, steam heaters, gas burners and similar heating means have been provided at the cooling tower outlets to warm the air and thus increase its buoyancy, at the same time reducing the relative humidity of the exhaust air. Another expedient is the parallel use of dry and wet cooling towers with mixing of the respective exhaust gases to increase the temperature and reduce the relative humidity of the air stream as it passes upwardly into the atmosphere. Other expedients include the use of a plurality of cells and fans to effect more rapid diffusion of the exhaust air into the atmosphere, and using larger, taller towers the exhaust air from which cools more slowly and, being introduced into the atmosphere at a higher altitude, have more time to completely diffuse into the atmosphere before reaching the ground.

THEORY AND SUMMARY OF THE INVENTION

The principal mechanisms of heat transfer in evaporative cooling systems are convection and evaporation. In warm weather, the effect of evaporation is much greater than that of convection. The transfer of heat by convection becomes quite important during cold weather operation, however, since the temperature difference between the hot tower influent water and the air is greater and the cold air has a more limited capacity for absorbing moisture. In wet cooling towers, the hot influent water is divided into a multiplicity of drops or spread into thin films to present a large surface area to the air passing thereover. The water is cooled through a combination of convection and evaporation while the air is heated by convection and cooled as a consequence of evaporation of the water. Thus, the temperature of the tower exhaust air may be greater or less than that of the entering air stream, depending upon the cooling tower operation conditions, especially the temperature of the incoming air.

Considering, qualitatively, the mechanism of convective heat transfer in the tower, it has been shown that the heat transferred by convection from the hot water to the cooler air is directly proportional to the difference in the temperatures of the water and air, the extent of the water/air interface surface area and the "convection coefficient". For a given surface area and temperature difference, the convection coefficient can readily be evaluated from empirical correlations as a function of the fluid (water and air) properties.

A major contribution to the cooling effect which takes place in a cooling tower is that which results from the evaporation of water from water surfaces, the temperature of the water/air mass being lowered due to the absorption of the latent heat of vaporization. Physically, water in the liquid state is converted to vapor, the gaseous state. This diffusion of water into the air is, however, only a part of the mass transfer of water to the air stream. Another part may come from droplets mechanically introduced into the air stream by spraying or splashing in the tower. Depending upon the relative humidity of the incoming air stream, the velocity of the air, and the temperature of the water, some of the droplets will be quickly evaporated into the air and some will be entrained by the air stream. These droplets represent a water loss without cooling influence on the hot water. In fact, evaporation from these droplets reduces the cooling performances of the tower by increasing the humidity of the air. The droplets which are entrained contribute a share of the total water load of the exhaust air and an understanding of the causative factors bearing on plume formation and mitigation of this undesirable condition requires study in greater depth of the manner and extent of the transfer of liquid water to the air stream within the cooling tower.

The total mass transfer of water to the air stream is the consequence of countervailing pressures, water vapor pressure and the air/vapor total pressure. Since pressure is a measure of molecular activity, the net rate of mass transfer from a liquid surface to a dry air stream is related to the difference between the average molecular activity of the water molecules at the liquid surface and the water molecules in the air stream. In other words, the total number of water molecules that escape from the liquid surface is proportional to the molecular activity at the surface and the number that are returned to the liquid is proportional to the average molecular activity of water vapor in the air. The net rate of mass transfer is thus the difference between that which leaves the surface and the quantity that returns. Although it is convenient to consider this phenomena in terms of individual molecules, small droplets may actually be involved in the mass transfer process, also.

Since the driving force to add water to the air is based upon fundamental principles of molecular activity, it may reasonably be concluded that this basic concept of mass transfer is valid and operative even when the ambient air becomes saturated. Thus, the net rate of water transfer from the liquid to the air is regulated by an increase in the resistance of the saturated air to absorb water rather than a change in the magnitude of the driving force to add water to the air. The number of water molecules to leave the water surface is proportional to the surface temperature and as the air becomes saturated, a supersaturated film forms near the liquid surface. This film provides a strong driving force which causes water molecules to re-enter the liquid.

Under these conditions, the temperature difference between the hot water and the air becomes important. If the temperature difference is large, some of the excess water vapor (water in excess of the equilibrium saturation amount) will remain in the air in the form of droplets. This phenomenon is herein designated "steaming". The mechanism by which this occurs may be either by condensation of the water vapor after it enters the saturated air or by actual transfer of droplets from the surface water to the air.

This formation of water droplets in otherwise saturated air may be regarded as the primary fog production mechanism in an evaporative cooling system.

In a cooling tower, convection, evaporation, and mechanical droplet formation occur simultaneously. Mechanical droplet formation is important in determining the quantity of drift from a cooling tower and in establishing the cooling performance loss of efficiency that results from complete evaporation of mechanically formed drops. Considering, first, the combined convection and evaporation heat transfer mechanisms and their effect on the ambient air stream, it may be noted that under normal cooling tower operation conditions, convection heat transfer tends to heat the passing air stream and evaporation tends to cool it. Thus, the water is cooler but the exit air may be at a higher or a lower temperature than the entering air and its enthalpy will be increased by an amount proportional to the heat loss from the circulating water. On a warm dry day, the ambient air has a large capacity to absorb water vapor and the temperature difference between the air and the influent hot water is small. Thus, the primary heat transfer phenomenon is evaporation. At the tower exit, the relatively moist exhaust air is rapidly diffused with its moisture load into the atmosphere. On a warm humid day, the cooling capacity of the tower will be reduced since evaporation, as well as convection, is limited by the ambient air conditions.

At cooler atmosphere temperatures, the air capacity to absorb moisture is diminished, but due to the larger temperature difference between the water and the air, convection plays a larger part of the total heat transfer operation. Under these conditions, more sensible heat is transferred directly to the passing air and, as a consequence, the capacity of the air to hold moisture is increased with corresponding improvement in the efficiency of evaporative heat transfer.

At lower atmospheric temperatures, another phenomenon becomes important. The combined effects of the driving force to add water to the air, the limited capacity of the air to absorb moisture, and the increased temperature difference between the water and the air results in the formation of relatively large quantities of moisture droplets in the more or less saturated air within the tower. These droplets, produced by steaming as above explained, are small enough to be entrained in the passing air and are thus carried out of the cooling tower to form an opaque fog exhaust plume.

If the air is heated in passing through the cooling tower, its water load capacity is correspondingly increased and the likelihood of condensation increased as the exhaust air passes into the cooler atmosphere. While the condensation droplets contribute to the pluming problem, the major cause is the steaming phenomenon which takes place inside of the cooling tower as above explained.

From the foregoing, it follows that potentially troublesome cooling tower exhaust pluming results when, within the cooling tower, the driving force to add moisture to the air is greater than the capacity of the air to absorb such moisture as water vapor and the temperature of the hot water is sufficiently greater than the air temperature that steaming occurs.

In accordance with this invention, cooling tower plume formation is controlled by preventing or mitigating steaming conditions. This is accomplished by reducing the temperature of the influent hot water and/or increasing the temperature of the tower inlet air either manually or by automatic control means. Since, presumably, a given wet cooling tower is designed to operate without pluming under a range of atmospheric conditions probably to be encountered at the location of the cooling tower, and alteration of the operating conditions must be effected when abnormal or extreme atmospheric conditions tend to cause pluming, a control system or manual means capable of making the necessary changes must be used with the tower. Such a control system would be designed to sense atmospheric conditions and hot water temperature.

The object of this invention is to provide method and means for preventing wet cooling tower exhaust plumes by controlling influent hot water and inlet air temperatures to avoid steaming within the tower.

DESCRIPTION OF THE DRAWINGS

In the accompanying drawings,

FIG. 1 is a side-elevational view, partly in section, showing a wet cooling tower having provision for both heating inlet air and cooling influent hot water in accordance with the invention;

FIG. 2 is a side-elevational view, partly in section, showing a wet cooling tower with means for cooling influent hot water; and FIG. 3 is a side-elevational view, partly in section, showing a wet cooling tower with means for using cooled water from the tower to reduce the temperature of influent hot water.

DESCRIPTION OF SPECIFIC EMBODIMENT

A typical wet cooling tower is illustrated in FIG. 1. Housing 1 contains a header 2 carrying a plurality of hot water distributors 3, spaced plates 4, a mist extractor 5 and a fan 6. A sump 7 is provided in the base of the housing for collection of the cooled water and a conduit 8 connects with the sump to carry away the cooled water.

In the operation of the cooling tower, the purpose of which is to continuously cool hot water supplied to it through inlet conduit 9 as indicated by the arrow, the hot water is spread by means of the distributors 3 over the surfaces of the spaced plates 4 to provide a very large area of water surface from which water may be evaporated and picked up by air supplied through inlet duct 10. Fan 6 continuously draws the air over the wet surfaces of plates 4, through the mist extractor 5 where at least the larger entrained droplets are removed and finally the air with its load of moisture is exhausted upwardly through the tower outlet 11. As is indicated in the drawing, the water, except that lost by evaporation or entrained with the air stream, drops from the plates 4 into sump 7 from which it is withdrawn through cooled water pipe 8.

From the foregoing discussion of the operation of wet cooling towers, it will be understood that under a normal range of atmospheric conditions the exhaust air propelled through tower outlet 11 is dissipated in the atmosphere as the air stream passes upwardly. There is no plume formation problem. The inlet air, drawn from the atmosphere without treatment, is sufficiently warm and dry to evaporate sufficient water to effect the desired cooling of the water that passes through the tower in the liquid state.

During unusually cold and/or humid weather, conditions both within the tower and in the atmosphere above the tower may change to cause pluming of the exhaust stream. At such times, and in accordance with the invention, adjustment of the temperature of the inlet air and/or the influent hot water may be made to counter the tendency of a plume to form and restore the condition of the exhaust air to that which makes possible to normal absorption of the moisture into the atmosphere.

It will be understood from the foregoing discussion that to avoid the pluming of the exhaust air due to the abnormal weather conditions hypothesized, either the temperature of the influent hot water must be lowered or the temperature of the inlet air must be elevated to reduce the differential between the temperatures of the water and of the air. In the embodiment of the invention illustrated in FIG. 1, the temperatures of both the water and of the air are adjusted to reduce the temperature differential. To this end, an indirect heat exchanger 13 is interposed in the inlet air duct and in hot water line 14. In the arrangement shown, alternative hot water lines 14 and 15 from the same source are connected to water influent conduit 9 through a proportioning valve 16 which can be controlled to adjust the relative quantities of hot water flowing through the alternative lines into the tower.

In the normal operation of the cooling tower, valve 16 is set to prevent flow through hot water line 14 so that the heat exchanger is inoperative. To meet the extraordinary weather conditions described above, valve 16 is adjusted to permit sufficient flow of hot water through line 14 to heat the inlet air and, in doing so, cool the hot water so that the mixture of hot water from lines 14 and 15 passing into influent conduit 9 is cooler than the supply hot water. The position of the control valve 16 should be such that enough hot water is directed through the heat exchanger to effect the desired result; namely, elimination of the exhaust plume. The maximum adjustment is that at which all of the water supplied through conduit 9 to the cooling tower passes through hot water line 14 and the heat exchanger 13.

In the embodiments of FIGS. 2 and 3, only the temperature of the influent water is adjusted to avoid the conditions that cause pluming. The condition of the air drawn from the atmosphere through air inlet duct 10 is not altered. In the arrangement of FIG. 2, an indirect heat exchanger 17 is provided to cool the tower influent hot water when necessary to counter plume-forming atmospheric conditions. A cooling medium, which may be, for example, water or air, is supplied from any source through conduit 18 to the heat exchanger wherein the hot water supplied through pipe 19 is cooled before it flows into the tower. The cooling medium is carried away by conduit 20.

It will be understood that the use of a cooling medium to reduce the temperature of the tower influent hot water is a temporary expedient employed to cope with extraordinary weather conditions that would otherwise cause pluming of the tower exhaust. For such limited use, it would usually be permissible to take water from a lake or stream to which it is then returned at a somewhat higher temperature.

The system illustrated in FIG. 3 provides for the temporary mixing of a limited amount of cooled water from the cooling tower to reduce the temperature of the hot water supplied to the tower. A suitable valve 21, shown schematically, is adjustable to permit any desired proportion of water to flow to influent pipe 22 from alternative sources 23 and 24, the former supplying the hot water to be cooled, the latter being connected to cooled water pipe 25, to supply cooled water from the sump of the tower. The system of FIG. 3, like that of FIG. 1, employs a closed water circuit.

The valve 21 (or functionally equivalent pumping system) used in the embodiment illustrated in FIG. 3 may be designed to divert a portion of the hot water stream 23 directly into the cooled water line 25. The amount of water so directed would be substantially equal to the portion of cooled water taken from line 25 and supplied to the tower hot water line 22 through connecting line 24.

OPERATION AND ACHIEVEMENTS

It must be recognized that plume-free operation of the wet cooling towers involves some sacrifice in the efficiency of the towers. For maximum cooling efficiency, a particular wet cooling tower should be designed for operation under normal atmospheric conditions at the locale of the installed unit. Operation under these normal, design conditions will be plume-free. When the temperature of the atmosphere is abnormally low and/or the humidity abnormally high, conditions which are known to cause pluming under normal operation of the tower, adjustments must be made in accordance with the invention in the operation of the tower to prevent plume formation and such adjustments cause loss of efficiency for the duration of such abnormal operation.

The tower may be operated to avoid pluming either manually or with suitable automatic controls. It is necessary to sense the advent of atmospheric conditions and hot water temperature which are known to cause pluming and this may be done by an operator, normally by the use of a thermometer and a humidity meter, or may be sensed by appropriate instrumentation. In either case, the alterations in the operation of the tower must be made to counter the formation of a plume at the exhaust of the tower. As above explained, this is done by reducing the temperature of the influent hot water and/or raising the temperature of the inlet air to reduce the temperature difference between the air and the water within the tower to the extent required by the severity of the abnormality of the atmospheric conditions. When the atmospheric conditions return to normal, this, again, is sensed either manually or by suitable automatic controls and the alterations in operation of the tower reversed to return to normal operation with maximum efficiency.

I claim:

1. In a wet cooling tower system including an influent hot water conduit leading from a source of hot water to be cooled, an inlet air duct and a cooled water conduit all connected into a tower containing means for bringing the air into contact with the hot water surfaces and having an exhaust air outlet, the improvement which comprises means for preventing plume formation, said plume preventing means comprising an indirect heat exchanger connected in the inlet air duct, a conduit connecting the cooling tower source of hot water to said exchanger as an exchanger medium for heating the inlet air and an exchanger outlet conduit connecting said exchanger with the influent hot water conduit to conduct the exchanger medium into the influent hot water conduit to mix with the influent hot water to partialy cool the same prior to introduction into the tower, and means for controlling the rate of flow of exchanger medium through said heat exchanger.

2. Structure in accordance with claim 1 wherein the means for controlling the rate of flow of exchanger medium through the heat exchanger comprises a proportioning valve connected in the influent hot water conduit at the connection therewith of the exchanger outlet conduit.

* * * * *